United States Patent
Guan

(10) Patent No.: US 7,042,174 B1
(45) Date of Patent: May 9, 2006

(54) METHOD OF GENERATING INDEPENDENT TOP AND BOTTOM CORNERS CORRECTION USING ONE 4TH ORDER FUNCTION

(75) Inventor: Charles Guan, San Francisco, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/914,415

(22) Filed: Aug. 9, 2004

(51) Int. Cl.
*H01J 29/72* (2006.01)

(52) U.S. Cl. .......................... 315/393; 315/3; 315/370

(58) Field of Classification Search .................. 315/3, 315/393, 370; 341/156; 330/254
See application file for complete search history.

(56) References Cited

U.S. PATENT DOCUMENTS

| | | | | |
|---|---|---|---|---|
| 5,247,301 | A * | 9/1993 | Yahagi et al. ................ | 341/156 |
| 5,805,022 | A * | 9/1998 | Bruccoleri et al. .......... | 330/254 |
| 6,449,020 | B1 * | 9/2002 | Salle et al. .................. | 348/645 |
| 6,452,366 | B1 * | 9/2002 | Hwang ........................ | 323/225 |
| 6,628,096 | B1 * | 9/2003 | Chen ........................... | 318/254 |

OTHER PUBLICATIONS

STMicroelectronics. TDAS9112 Low-Cost I²C Controlled Deflection Processor for Multisync Monitor. Aug. 2003. 26pp.

* cited by examiner

*Primary Examiner*—Don Wong
*Assistant Examiner*—Hung Tran Vy
(74) *Attorney, Agent, or Firm*—John W. Branch; Darby & Darby PC

(57) ABSTRACT

A method and circuit for generating independent top and bottom corner correction using a single fourth order function is described. The top and bottom corner correction signal may be included in an east-west corrected voltage to correct an asymmetry of a picture with respect to a horizontal axis and a vertical axis of the picture. Two switch signals based on a ramping voltage, which is used to sweep an electron beam, and two clock signals control a sample-and-hold circuit. The sample-and-hold circuit is arranged to sample a fourth order voltage during a top portion and a bottom portion of the ramping voltage and provide two independent correction voltages $V_{out\_top}$ and $V_{out\_bottom}$. The correction voltages are then provided for top and bottom corner correction to the east-west corrected voltage.

21 Claims, 4 Drawing Sheets

METHOD OF GENERATING INDEPENDENT TOP AND BOTTOM CORNERS CORRECTION USING ONE 4TH ORDER FUNCTION

FIELD OF THE INVENTION

The present invention relates to cathode ray tube (CRT) controls, and in particular, to a method and circuit for performing top and bottom corner correction using a single fourth order function.

BACKGROUND

Cathode Ray Tube's (CRT's) are commonly used in many industrial and consumer electronic devices such as EKG-monitors, oscilloscopes, computer monitors, TV's, and the like. CRT based monitors typically include a CRT and control circuitry. The CRT generally comprises a glass tube with a "bottle neck" portion and a screen, an electron beam gun, and filter devices that are arranged to mask and guide the electron beam.

The screen is internally coated with a photo-emitting material (commonly, a phosphor-based chemical), which is activated by the electron beam. When electrons impinge on the inside of the screen, the energetic electrons collide with photo-emitting material that generate pixels on the display. Because the screen is not shaped as a perfect sphere and the displayed information is generally rectangularly shaped, an intensity of the electron beam is controlled by various circuits for different regions of the display.

Control circuitry includes horizontal, vertical, and east-west control circuits among other sub-circuits. While the horizontal control circuit manages an adjustment and a correction of horizontal deflection frequency, the vertical control circuit's main goal is to drive vertical deflection correction circuit. The east-west control circuit provides a correction signal for correcting geometric errors of the electron beam that result in an asymmetry between vertical and horizontal axes across a middle of the picture. This asymmetry may cause the displayed picture to have a pin-cushion or barrel shape with top and bottom corners of the picture not being vertically aligned with a middle of the picture. Another result of the east-west asymmetry may result in a circle in the picture appearing in an elliptical shape.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Briefly stated, the present invention is related to providing east-west correction for top and bottom corners using one fourth order waveform. In a typical CRT-based monitor, an electron beam is swept by a horizontal sweep voltage $V_{horz\_sweep}$ and a vertical sweep voltage $V_{vert\_sweep}$. The sweep voltages commonly have a substantially sawtooth shape. Because a screen of a CRT tube is not substantially spherical and a picture that is displayed has a substantially rectangular shape, one of the distortions that occurs is a geometric asymmetry of the picture with respect to a vertical axis and a horizontal axis at a center of the picture.

To reduce this asymmetry, a top and bottom corner correction signal may be applied to east-west correction voltage $V_{E-W}$, that is employed to correct a sweep voltage $V_{ramp}$. To provide the east-west correction for the top corners of the screen the fourth order voltage $V_{4th}$ may be employed. To provide the east-west correction for the bottom corners of the screen, another fourth order voltage $V_{4th}'$ may be employed.

According to one aspect of the present invention, a single fourth order voltage, generated by a waveform generator, may be used to generate a top corner correction voltage $V_{out\_top}$ and a bottom corner correction voltage $V_{out\_bottom}$. The correction voltages $V_{out\_top}$ and $V_{out\_bottom}$ may subsequently be included in the east-west correction voltage $V_{E-W}$ for geometric correction of the electron beam in the CRT.

Figure 1:
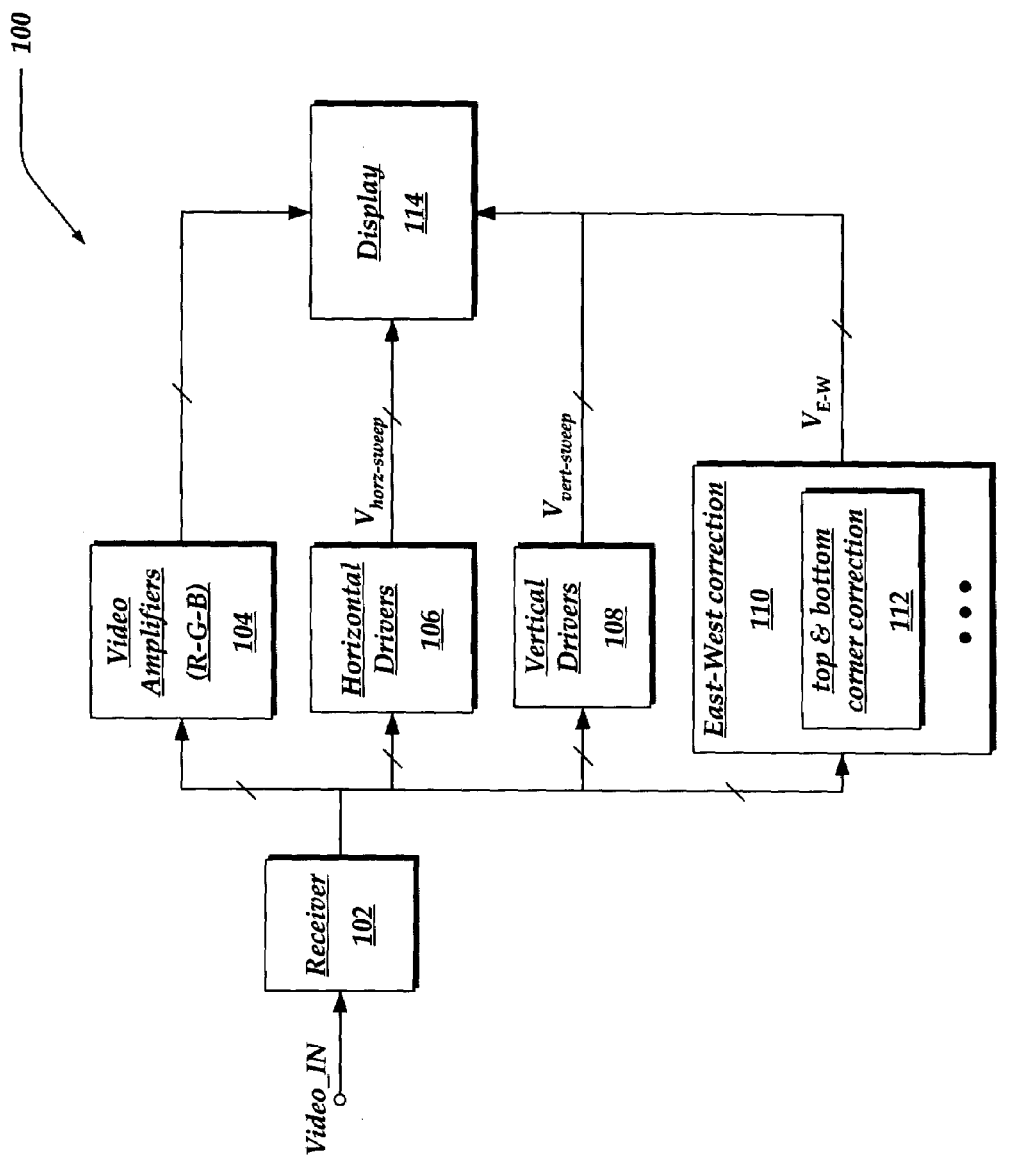
FIG. 1 is a block diagram illustrating a CRT-based monitor and its control circuitry.

FIG. 1 is a block diagram illustrating CRT-based monitor 100 and its control circuitry. CRT-based monitor 100 includes receiver 102, video amplifiers 104, horizontal drivers 106, vertical drivers 108, east-west correction circuit 10, and display 114. East-west correction circuit 110 may include among other circuits, top and bottom corner correction circuit 112. CRT-based monitor 100 may include additional components.

CRT-based monitor 100 is arranged to receive an external signal Video_IN at receiver 102 and display a picture on display 114 based on Video_IN. Receiver 102 is arranged to process Video_IN and provide control circuitry, such as video amplifiers 104, horizontal drivers 106, vertical drivers 108, and the like, with an input signal. Typically, display 114 includes an electron beam generator, a screen, and filtering and control devices that may be driven by outputs of video amplifiers 104, horizontal drivers 106, vertical drivers 108, east-west correction circuit 110, and the like. An internal surface of the screen may be coated with photo-emitting material that is activated by an electron beam from the electron beam generator.

In a color CRT-based monitor, the electron beam or multiple electron beams may be directed to different color emitting pixels on the screen such as red-green-blue. Such a monitor may include multiple video amplifiers 104 for each basic color (red, green, and blue).

The electron beam is commonly swept across the screen horizontally and vertically to form the desired picture on the screen. Horizontal drivers 106 and vertical drivers 108 are arranged to provide voltages $V_{horz\_sweep}$ and $V_{vert\_sweep}$ for sweeping the electron beam across the screen. Because a shape of the screen is typically not an ideal sphere and a desired picture is typically substantially rectangular, non-linearities may occur in form of non-linear vertical line spacing, and the like.

As mentioned above, a geometric asymmetry of the picture with respect to a vertical axis and a horizontal axis at a center of the picture may also occur as a result of a difference between a shape of the screen and the picture that is being displayed. To reduce this asymmetry, a top corner correction voltage $V_{out\_top}$ and a bottom corner correction voltage $V_{out\_bottom}$ may be generated by east-west correction circuit 110. These voltages may be employed to correct the sweep of the electron beam such that symmetry of the picture with respect to a vertical axis and a horizontal axis at a center of the picture is preserved. Top and bottom correction circuit 112 is discussed in more detail below in conjunction with FIGS. 2 and 3.

FIG. 1 shows a particular arrangement of inputs and outputs of the various components. Other arrangements of the components may be implemented without departing from the scope and spirit of the present invention.

Figure 2:
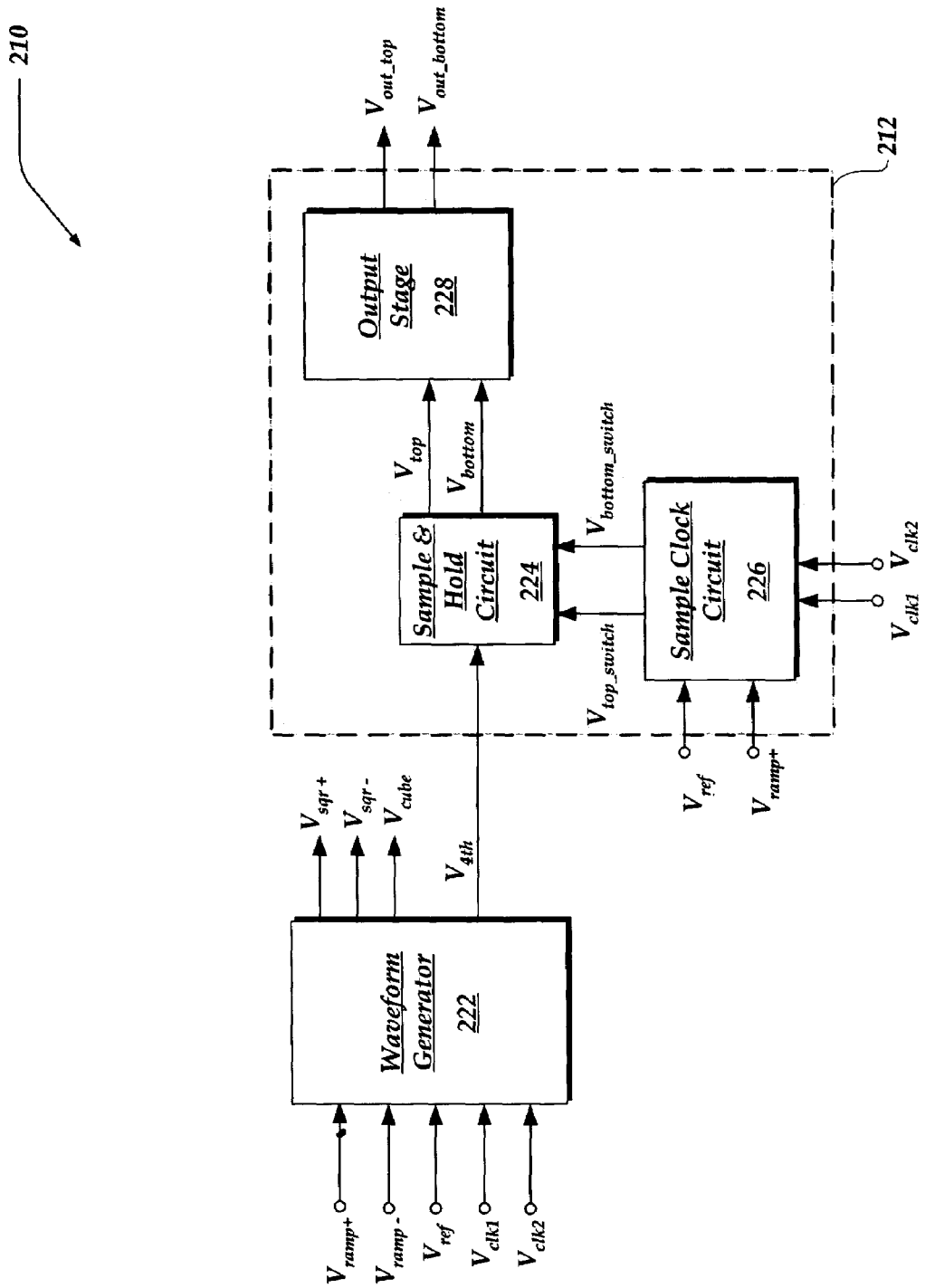
FIG. 2 is a block diagram illustrating a portion of an east-west correction circuit.

FIG. 2 is a block diagram illustrating a portion of east-west correction circuit 210. East-west correction circuit 210 may be implemented in a control section of a CRT driver circuitry such as shown in FIG. 1. East-west correction circuit 210 includes waveform generator 222 and top and bottom corner correction circuit 212. Top and bottom corner correction circuit 212 may include sample-and-hold circuit 224, sample clock circuit 226, and output stage 228. East-west correction circuit 210 may include other components that are not shown in this figure.

East-west correction circuit 210 is arranged to provide an east-west correction voltage $V_{E-W}$ that includes top corner correction voltage $V_{out\_top}$ and bottom corner correction voltage $V_{out\_bottom}$ such that a geometric asymmetry of the picture with respect to a vertical axis and a horizontal axis at a center of the picture is reduced.

East-west correction circuit 210, according to one embodiment of the present invention, employs a single fourth order voltage $V_{4th}$ to generate both corner correction voltages $V_{out\_top}$ and $V_{out\_bottom}$ without employing a rectifier for generation of $V_{4th}$.

Waveform generator 222 is arranged to receive positive ramping voltage $V_{ramp+}$, negative ramping voltage $V_{ramp-}$, reference voltage $V_{ref}$, first clock voltage $V_{clk1}$, and second clock voltage $V_{clk2}$. Waveform generator 222 may provide higher order voltages for various correction circuits. For example, $V_{sqr+}$ and $V_{sqr-}$ may be employed by a C linearity correction circuit and third order voltage $V_{cube}$ may be employed by an S linearity correction circuit. Waveform generator 222 is further arranged to provide fourth order voltage $V_{4th}$ to top and bottom corner correction circuit 212.

In one embodiment, waveform generator 222 may be included east-west correction circuit 210. In another embodiment, waveform generator 222 may be combined with another circuit of a CRT-based monitor.

Sample clock circuit 226 is arranged to receive positive ramping voltage $V_{ramp+}$, reference voltage $V_{ref}$, first clock voltage $V_{clk1}$, second clock voltage $V_{clk2}$, and to provide sampling clock signals $V_{bottom\_switch}$ and $V_{top\_switch}$ to sample-and-hold circuit 224 determining when the sample-and-hold cycles are to begin.

Sample-and-hold circuit 224 is arranged to receive $V_{4th}$, $V_{bottom\_switch}$, and $V_{top\_switch}$, and to provide $V_{top}$ and $V_{bottom}$ in response to $V_{4th}$, $V_{bottom\_switch}$, and $V_{top\_switch}$. By sampling and holding a top portion and a bottom portion of $V_{ramp}$ based on $V_{4th}$, sample-and-hold circuit 224 enables top and bottom corner correction based on a single fourth order voltage.

Output stage 228 is arranged to receive $V_{top}$ and $V_{bottom}$ from sample-and-hold circuit 226, and to provide top corner correction voltage $V_{out\_top\ and\ bottom}$ corner correction voltage $V_{out\_bottom}$. $V_{out\_top}$ and $V_{out\_bottom}$ may later be combined with east-west sweep voltage $V_{E-W}$ at a subsequent circuit (not shown) to correct the electron beam such that a picture asymmetry with respect to the horizontal and the vertical axis of the picture is reduced.

FIG. 2 shows a particular arrangement of inputs and outputs of the various components. In one embodiment, all of the components of east-west correction circuit 210 may be included in the same chip. Alternatively, one or more of the components may be off-chip.

Figure 3:
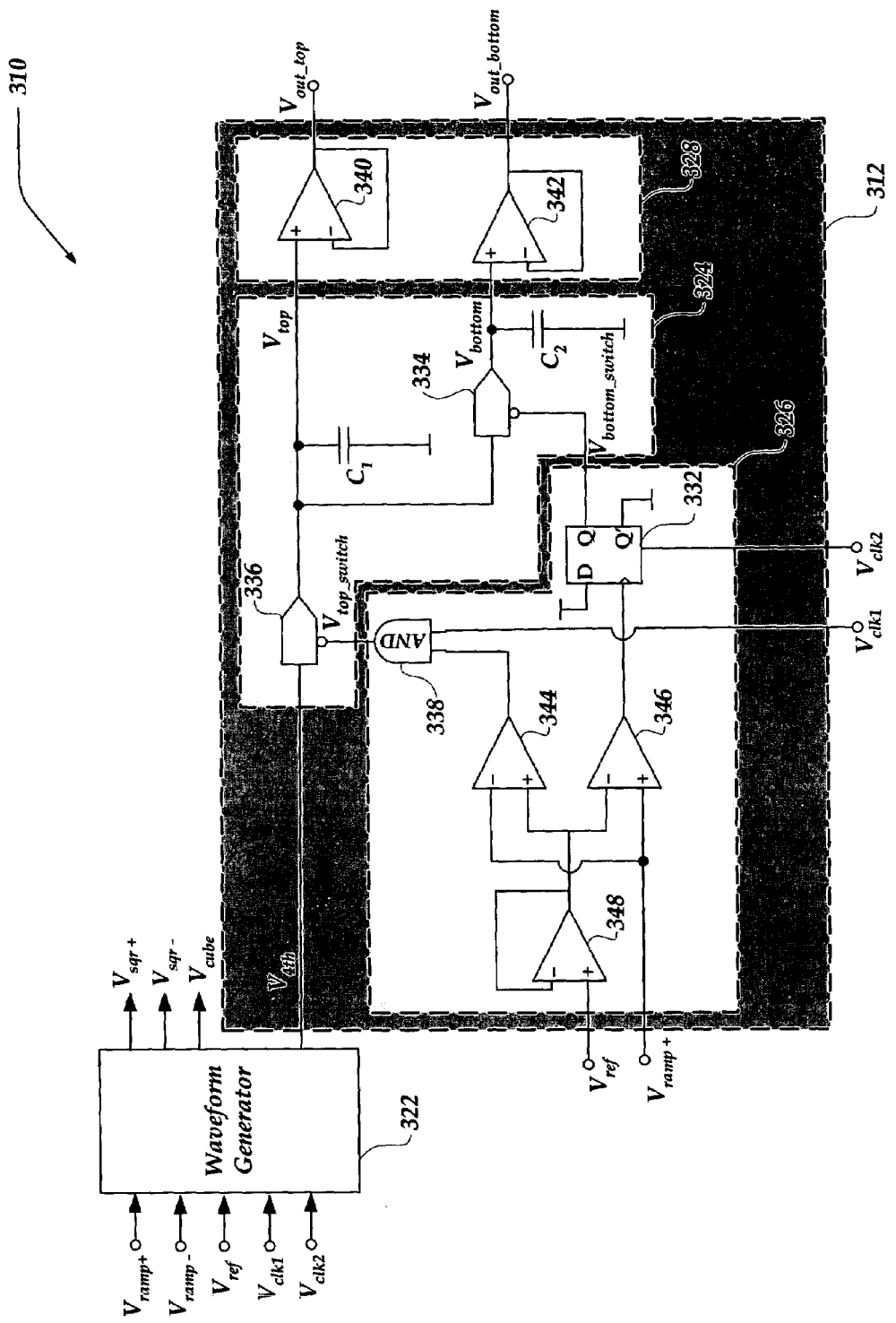
FIG. 3 schematically illustrates an embodiment of the portion of the east-west correction circuit of FIG. 2.

FIG. 3 schematically illustrates an embodiment of a portion of east-west correction circuit 310. East-west correction circuit 310 may include waveform generator 322 and top and bottom corner correction circuit 312. Top and bottom corner correction circuit 312 may include sample-and-hold circuit 324, sample clock circuit 326, and output stage 328.

Waveform generator 322 operates essentially as described in FIG. 2 for waveform generator 222 to generate higher order waveforms for various correction circuits.

Sample clock circuit 326 operates essentially as described in FIG. 2 for sample clock circuit 226 providing sampling clock signals $V_{bottom\_switch}$ and $V_{top\_switch}$ that determine a timing of sampling periods for top and bottom correction voltages.

Sample clock circuit 326 may include unity gain buffer 348, which is arranged to receive reference voltage $V_{ref}$ and to provide $V_{ref}$ to differential amplifiers 344 and 346. Differential amplifiers 344 and 346 are arranged to operate as comparators, comparing ramping voltage $V_{ramp+}$ to $V_{ref}$. Differential amplifier 344 is arranged to receive $V_{ramp+}$ at a inverting input and provide one input signal of AND gate 338 based on a comparison of $V_{ramp+}$ with $V_{ref}$, wherein $V_{ref}$ is provided to a non-inverting input of differential amplifier 344. Another input of AND gate 338 is first clock signal $V_{clk1}$. AND gate 338 is further arranged to provide a first timing signal $V_{top\_switch}$ to a control input of transmission gate 336 of sample-and-hold circuit 324 such that $V_{4th}$ is sampled during an upper portion of $V_{ramp+}$ as determined by $V_{ref}$. Based on the comparison of $V_{ramp+}$ with $V_{ref}$, $V_{4th}$ is sampled when $V_{ramp+}$ exceeds $V_{ref}$.

Differential amplifier 346 is arranged to receive $V_{ramp+}$ at a non-inverting input and provide an output signal to flip flop 332 based on a comparison of $V_{ramp+}$ with $V_{ref}$ that is received at an inverting input. Flip flop 332 is arranged to provide a second timing signal $V_{bottom\_switch}$ to transmission gate 334 of sample-and-hold circuit 334 such that $V_{4th}$ is sampled during a lower portion of $V_{ramp+}$ when $V_{ramp+}$ is less than $V_{ref}$. Because at the end of one cycle, $V_{ramp+}$ drops rapidly to its minimum, $V_{bottom\_switch}$ may have to be relatively more accurate than $V_{top\_switch}$. Q-output of flip flop 332 provides a fast and accurate timing signal such that transmission gate 334 can sample $V_{4th}$ shortly after $V_{ramp+}$ begins to rise again. A D-input of flip flop 332 may be coupled to a positive supply voltage of the circuit.

While flip flop 332 is described as a D flip flop, it may be implemented as any other type of flip flop such as a JK flip flop, and the like, without departing from the spirit and the scope of the invention.

Sample-and-hold circuit 324 is arranged to receive fourth order voltage $V_{4th}$ and provide $V_{top}$ and $V_{bottom}$ based on sampling $V_{4th}$ first during the upper portion and then during the lower portion of $V_{ramp+}$. As described above, the upper portion and the lower portion of $V_{ramp+}$ for sampling $V_{4th}$ are determined based on a comparison of $V_{ramp+}$ with $V_{ref}$ in sample clock circuit 326.

Sample-and-hold circuit 324 includes two sample-and-hold sub-circuits, each sub-circuit comprising one transmission gate and one holding capacitor. Transmission gate 336 is arranged to receive $V_{4th}$ and first timing signal $V_{top\_switch}$ and provide a sampled portion of $V_{4th}$ during the upper portion of $V_{ramp+}$ to holding capacitor $C_1$. Holding capacitor $C_1$ is arranged to provide $V_{top}$ to output stage 328.

Transmission gate 334 is arranged to receive $V_{4th}$ and second timing signal $V_{bottom\_switch}$ and provide a sampled portion of $V_{4th}$ during the lower portion of $V_{ramp+}$ to holding capacitor $C_2$. Holding capacitor $C_2$ is arranged to provide $V_{bottom}$ to output stage 328. In one embodiment, sampling transistors may be employed in place of transmission gates 334 and 336.

$V_{clk1}$, essentially, operates as an enable signal. When $V_{clk1}$ has a low value sampling by transmission gate 336 may be disabled. Sampling may resume when $V_{clk1}$ changes to a high value again. Similar to $V_{clk1}$, $V_{clk2}$ is arranged to provide an enable signal to transmission gate 334 through flip flop 332.

Output stage 328 is arranged to receive $V_{top}$ and $V_{bottom}$, and to provide top corner correction voltage $V_{out\_top}$ and bottom corner correction voltage $V_{out\_bottom}$ for combination with a sweep voltage at a subsequent stage (not shown).

In one embodiment, output stage 328 may include operational amplifiers 340 and 342 that are arranged to operate as unity gain followers. Operational amplifiers 340 and 342 are configured to receive $V_{top}$ and $V_{bottom}$, and to provide $V_{out\_top}$ and $V_{out\_bottom}$. In a further embodiment, output stage 328 may include additional components to further adjust $V_{top}$ and $V_{bottom}$.

Figure 4:
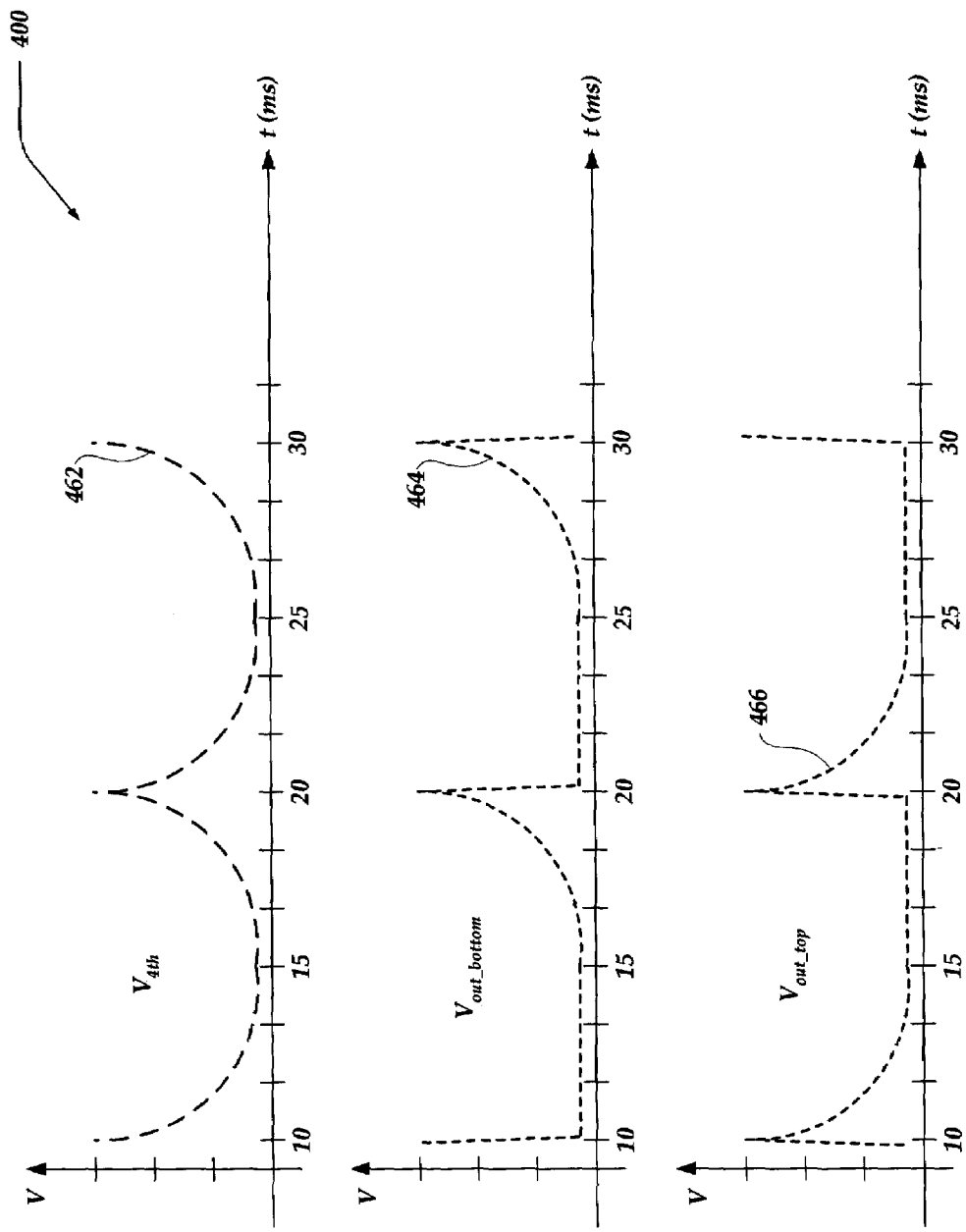
FIG. 4 illustrates waveforms of top and bottom correction voltages of the east-west correction circuit of FIG. 3 according to the present invention.

FIG. 4 illustrates voltage diagrams 400 showing waveforms of top and bottom correction voltages of the east-west correction circuit of FIG. 3. Voltage diagrams 400 include diagram 462 showing two cycles of fourth order voltage $V_{4th}$, diagram 464 showing two cycles of bottom corner correction voltage $V_{out\_bottom}$, and diagram 466 showing two cycles of top corner correction voltage $V_{out\_top}$. While voltage diagrams 400 show only two cycles of the above listed voltages, the waveforms are representative of continuous voltages, where the cycles are typically repeated as long as the circuit operates.

Vertical axes of voltage diagrams 400 represent voltage V. Horizontal axes represent time t in milliseconds (ms). While milliseconds are represented on voltage diagrams 400, the invention is not so limited. Virtually any voltage and time units may be employed in implementing the present invention without departing from spirit and scope of the invention.

Waveform 462 representing $V_{4th}$ begins at a high point of the fourth order parabolic voltage drops to a minimum and rises to the high point again. The cycle is repeated after that.

Waveform 464 representing $V_{out\_bottom}$ drops rapidly to a minimum at the high point of $V_{4th}$ and remains at its minimum until $V_{4th}$ begins to rise. In the second half of the cycle $V_{out\_bottom}$ follows $V_{4th}$ and rises with a fourth order slope. When $V_{4th}$ reaches its high point, $V_{out\_bottom}$ drops rapidly again, and the cycle is repeated.

Waveform 466 representing $V_{out\_top}$ follows an opposite pattern. In the first half of the cycle, $V_{out\_top}$ drops following a fourth order parabolic slope until $V_{4th}$ and $V_{out\_top}$ reach their minima. In the second half of the cycle, $V_{out\_top}$ remains at its minimum until $V_{4th}$ reaches its high point, when $V_{out\_top}$ rises rapidly to its high point. The cycle is then repeated with the same pattern.

The above specification, examples and data provide a description of the manufacture and use of the composition of the invention. Since many embodiments of the invention can be made without departing from the spirit and scope of the invention, the invention also resides in the claims hereinafter appended.

I claim:

1. A device for performing top and bottom corner correction for a Cathode Ray Tube (CRT) monitor, the device comprising:

a sample-and-hold circuit that is arranged to receive a fourth order voltage, a first switch signal, and a second switch signal; and to provide a first voltage and a second voltage for top and bottom corner correction by sampling the fourth order voltage in response to the first switch signal and the second switch signal; and a sample clock circuit that is arranged to provide the first switch signal and the second switch signal in response to a reference voltage and a sweep voltage such that the fourth order voltage is sampled during an upper portion of the sweep voltage and sampled again during a lower portion of the sweep voltage.

2. The device of claim 1, further comprising:

an output stage that is arranged to provide a top corner correction voltage and a bottom corner correction voltage in response to the first voltage and the second voltage so that a picture displayed on the CRT monitor is substantially symmetric with respect to a vertical axis and a horizontal axis of the picture.

3. The device of claim 1, further comprising a waveform generator that is arranged to provide the fourth order voltage in response to the sweep voltage, the reference voltage, and an inverted sweep voltage.

4. The device of claim 3, wherein the fourth order voltage is determined based on a center value of the sweep voltage.

5. The device of claim 3, wherein the waveform generator is further arranged to provide a second order voltage for a C linearity correction circuit and a third order voltage for a S linearity correction circuit.

6. The device of claim 1, wherein the sample-and-hold circuit comprises:

a first sampling device and a first holding capacitor that are arranged to receive the fourth order voltage, and to provide the first voltage based on the fourth order voltage and the first switch signal; and a second sampling device and a second holding capacitor that are arranged to receive the fourth order voltage, and to provide the second voltage based on the fourth order voltage and the second switch signal.

7. The device of claim 6, wherein:

the first sampling device and the first holding capacitor provide the first voltage based on sampling the fourth order voltage when a value of the sweep voltage exceeds a value of the reference voltage; and the second sampling device and the second holding capacitor provide the second voltage based on sampling the fourth order voltage when another value of the sweep voltage is less than another value of the reference voltage.

8. The device of claim 6, wherein the first sampling device and the second sampling device each include one of a transmission gate and a sampling transistor.

9. The device of claim 1, wherein the output stage comprises:
a first buffer that is arranged to receive the first voltage and provide the top corner correction voltage; and
a second buffer that is arranged to receive the second voltage and provide the bottom corner correction voltage.

10. The device of claim 1, wherein the output stage comprises:
a first operational amplifier that is arranged to receive the first voltage and provide the top corner correction voltage with a predetermined gain; and
a second operational amplifier that is arranged to receive the second voltage and provide the bottom corner correction voltage with a predetermined gain.

11. The device of claim 1, wherein the sample clock circuit comprises:
a first comparator that is arranged to receive the sweep voltage at an inverted input and the reference voltage at a non-inverted input, and to provide a first result voltage; and
an AND gate that is arranged to receive the first result voltage and a first clock signal, to perform an AND operation, and to provide the first switch signal to a first sampling device of the sample-and-hold circuit so that the fourth order voltage is sampled during a period when a value of the sweep voltage exceeds a value of the reference voltage.

12. The device of claim 11, wherein the sample clock circuit further comprises:
a second comparator that is arranged to receive the sweep voltage at a non-inverted input and the reference voltage at an inverted input, and to provide a second result voltage; and
a flip-flop that is arranged to receive the second result voltage, a positive supply voltage, and a second clock signal; and to provide the second switch signal to a second sampling device of the sample-and-hold circuit so that the fourth order voltage is sampled during a period when another value of the sweep voltage is less then another value of the reference voltage.

13. The device of claim 12, wherein the first clock signal is arranged to operate as an enable signal for a first sampling device and the second clock signal is arranged to operate as an enable signal for a second sampling device.

14. A method for performing top and bottom corner correction for a Cathode Ray Tube (CRT) monitor, the method comprising:
receiving a fourth order voltage, a first switch voltage, and a second switch voltage;
performing a first sampling of the fourth order voltage in response to the first switch voltage, wherein the first sampling is performed during a period when a value of a sweep voltage exceeds a value of a reference voltage;
providing the first sampled fourth order voltage such that the sampled fourth order voltage is combined with the sweep voltage to provide a top corner correction voltage for a CRT monitor;
performing a second sampling of the fourth order voltage in response to the second switch voltage, wherein the second sampling is performed during a period when another value of the sweep voltage is less than another value of the reference voltage; and
providing the second sampled fourth order voltage such that the sampled fourth order voltage is combined with the sweep voltage to provide a bottom corner correction voltage for a CRT monitor.

15. The method of claim 14, further comprising:
receiving the reference voltage and the sweep voltage;
comparing an inverted sweep voltage to the reference voltage; and
providing the first switch voltage based on the comparison such that the first switch voltage enables sampling of the fourth order voltage when the value of the sweep voltage exceeds the value of the reference voltage.

16. The method of claim 14, further comprising:
comparing the sweep voltage to an inverted reference voltage; and
providing the second switch voltage based on the comparison such that the second switch voltage enables sampling of the fourth order voltage when the other value of the sweep voltage is less than the other value of the reference voltage.

17. The method of claim 14, wherein the top corner correction voltage and the bottom corner correction voltage enable an adjustment of an electron beam in a CRT monitor, such that an asymmetry of a picture displayed on the CRT monitor with respect to a vertical axis and a horizontal axis of the picture is substantially reduced.

18. The method of claim 14, wherein:
the sweep voltage has a substantially sawtooth-like shape; and
the fourth order voltage has a fourth order parabolic shape.

19. The method of claim 18, wherein the fourth order voltage is determined based on a center value of the sweep voltage.

20. A device for performing top and bottom corner correction for a Cathode Ray Tube (CRT) monitor, the device comprising:
a sample-and-hold circuit that is arranged to sample a fourth order voltage in response to a first switch signal and a second switch signal; and
a sample clock circuit that is arranged to receive a reference voltage and a sweep voltage, and to provide:
the first switch signal based, in part, on a comparison of the sweep voltage with the reference voltage such that the fourth order voltage is sampled by the sample-and-hold circuit when a value of the sweep voltage exceeds a value of the reference voltage; and
the second switch signal based, in part, on a comparison of the sweep voltage with the reference voltage such that the fourth order voltage is sampled again by the sample-and-hold circuit when another value of the sweep voltage is less than another value of the reference voltage.

21. The device of claim 20, further comprising:
an output stage that is arranged to provide:
a top corner correction voltage based, in part, on sampling the fourth order voltage when the value of the sweep voltage exceeds the value of the reference voltage; and
a bottom corner correction voltage based, in part, on sampling the fourth order voltage when the other value of the sweep voltage is less than the other value of the reference voltage.

* * * * *

UNITED STATES PATENT AND TRADEMARK OFFICE
CERTIFICATE OF CORRECTION

PATENT NO.       : 7,042,174 B1
APPLICATION NO.  : 10/914415
DATED            : May 9, 2006
INVENTOR(S)      : Charles Guan It is certified that error appears in the above-identified patent and that said Letters Patent is hereby corrected as shown below:

Title Page, under Other Publications, item [56] Col. 2 (Attorney, Agent, or Firm) Line 2,
Delete "PC" and insert -- P.C. --.

Sheet 1 of 4 (Beside Box. 106) (Fig. 1), Line 1, Delete "$V_{horz\text{-}sweep}$" and insert -- $V_{horz\_sweep}$ --.

Sheet 1 of 4 (Beside Box. 108) (Fig. 1), Line 1, Delete "$V_{vert\text{-}sweep}$" and insert -- $V_{vert\_sweep}$ --.

Column 2, Line 41 (Approx.) Delete "$V_{4th}$'" and insert -- $V_{4th}$ --.

Column 2, Line 53, Delete "10," and insert -- 110 --.

Column 3, Line 63, Delete "an" and insert -- a --.
Column 4, Line 49, Delete "a" and insert -- an --.
Column 7, Line 45, In Claim 12, delete "then" and insert -- than --.

Signed and Sealed this

Fifth Day of September, 2006

JON W. DUDAS
*Director of the United States Patent and Trademark Office*